United States Patent
Genevois et al.

(10) Patent No.: US 6,431,442 B1
(45) Date of Patent: Aug. 13, 2002

(54) METHOD FOR AUTOMATICALLY MEASURING ELEMENTARY TIME UNIT FOR COMMUNICATION PERIPHERALS DEDICATED TO SMART CARDS

(75) Inventors: Christophe Genevois; Arnaud Boursier, both of Nice (FR)

(73) Assignee: SCM Schneider Microsysteme-Microsystemes, Schneider Entwicklungs und Vertriers GmbH S.A.R.L. Developpement et Ventes, La Ciotat (FR)

( * ) Notice: Subject to any disclaimer, the term of this patent is extended or adjusted under 35 U.S.C. 154(b) by 0 days.

(21) Appl. No.: 09/445,577

(22) PCT Filed: Jun. 4, 1998

(86) PCT No.: PCT/FR98/01129

§ 371 (c)(1),
(2), (4) Date: Dec. 13, 1999

(87) PCT Pub. No.: WO98/57288

PCT Pub. Date: Dec. 17, 1998

(30) Foreign Application Priority Data

Jun. 12, 1997 (FR) .......................................... 97 07454

(51) Int. Cl.⁷ .................................................. G06K 5/00
(52) U.S. Cl. ...................................... 235/380; 234/492
(58) Field of Search .................................. 235/380, 379, 235/492; 713/400, 502, 500; 710/33, 60–62, 71

(56) References Cited

U.S. PATENT DOCUMENTS

| 5,149,945 A | * | 9/1992 | Johnson et al. |
| 5,159,337 A | * | 10/1992 | Lankreijer |
| 5,418,485 A | * | 5/1995 | Duret et al. |
| 5,623,522 A | | 4/1997 | Ito .............................. 375/369 |

FOREIGN PATENT DOCUMENTS

| DE | 30 12 075 | | 10/1981 |
| EP | 0 347 894 | | 12/1989 |
| EP | 617379 | * | 9/1994 |
| FR | 2 613 101 | | 9/1988 |
| JP | 04 319756 | | 3/1993 |

* cited by examiner

*Primary Examiner*—Michael G. Lee
*Assistant Examiner*—Diane I. Lee
(74) *Attorney, Agent, or Firm*—Young & Thompson

(57) ABSTRACT

A process for automatically measuring the unit of time (ETU=Elementary Time Unit) for communication peripherals dedicated to smart cards during a dialogue between a reader and the smart card, so as to configure the reading device. This process consists in taking account of the descending front of the start bit, taking account of the ascending front of the start bit, and measuring the time between the descending and ascending fronts, which permits the automatic calibration of the communication processor.

4 Claims, No Drawings

METHOD FOR AUTOMATICALLY MEASURING ELEMENTARY TIME UNIT FOR COMMUNICATION PERIPHERALS DEDICATED TO SMART CARDS

FIELD OF THE INVENTION

The present invention relates to a process for measuring the time unit (ETU=Elementary Time Unit) during a dialogue between a reader and a smart card, so as to configure the reading device.

The state of the art at present proposes a technique of sampling of the first octet or character, then a calibration by means of software.

During the start-up of a dialogue between a reader and a smart card, the reading device must be configured to sample the data transmitted in series or in an asynchronous fashion by the card (width of each transmitted bit=1 ETU).

To the nearest decimal point, the width of each bit is ETU=372 CLK, namely 1/9600 second for a card timed to 3.57 megahertz (MHz). However, certain cards have a value to the nearest decimal point of 512 CLK.

There is known from EP-A-0 347 894 a card with integrated circuits having recognition means (22) to determine whether the charged card (23) has an identifiable frequency.

However, only a limited number of frequencies can be identified according to this technique.

There is also known from the Patent Abstract of Japan JP 04-319756, an interface of a communication series adapted to reconstitute the frequency of transmission in the connection series.

According to the invention, a processor for measuring the time unit during start-up of the dialogue permits operating in a transparent manner with cards having ETUs that are different to the nearest decimal point.

The old techniques of sampling require considerable time and use for that purpose a microprocessor. The invention permits increasing the speed of taking account of the time unit by not using software, but rather conventional computer hardware.

SUMMARY OF THE INVENTION

To this end, the present invention relates to a process for measuring the time unit (ETU=Elementary Time Unit) during a dialogue between a reader and a smart card, so as to configure the reading device, characterized in that it consists:

in taking account of the descending front of the start bit,
taking account of the ascending front of said start bit, and
measuring the time between said descending and ascending fronts, which permits the automatic calibration of the communication processor.

The measured time corresponds to the low level of the start bit.

The time is measured as a number of cycles of the card clock.

The automatic calibration consists:
in defining the value of a half unit of time,
carrying over this value after the ascending front of the start bit to define the middle of the following bit,
carrying over successively the value of a time unit to define the position of each successive bit.

The processor can be used with different values of the time unit, such as ETU=372 CLK or ETU=512 CLK.

This process, in which the first character is constituted by the start bit (low level during a unit of time) then a so-called time sharing bit or TS (high level during the unit of time) is characterized in that after the TS bit, it is possible to reprogram or to adjust the value of the unit of time measured.

The processor permits the elimination of parasitic signals, which is to say values of the time unit that are too small.

DETAILED DESCRIPTION OF THE INVENTION

The present invention relates to a process for measuring the time unit which regulates the exchanges between a reader and a smart card.

This process thus permits configuring the reading device no matter what the value of the unit of value.

During start-up of the dialog (ATR: Answer To Reset), the calibration of the time unit or ETU, takes place automatically with reception of the first character TS which is defined by the standard.

No matter what the convention (direct or the reverse), this character has the characteristic of being comprised by a start bit.

This start bit is constituted by a transition from 1 toward 0, then a stabilization at 0 during an ETU, finally to return to the high level for at least one ETU.

The communication processor, which comprises means permitting the use of the process according to the invention, will thus be automatically calibrated by the measurement of the time between the descending front, transition from 1 to 0, of the start bit and the rising front, 0 to 1, again of this start bit.

This time measured in numbers of clock cycles of the smart card is equal to the ETU of the card. The clock operates of course with the help of a quartz system.

The value of the ETU is then used to sample the rest of the bits constituting the character TS.

At the end of reception of the TS, it is possible to reprogram and to adjust the measured value of the ETU.

Moreover, this processor is designed to eliminate parasitic signals when the values of the time unit are too small.

This invention has the advantage of permitting dialogue in a transparent manner with cards working at standardized rates that are different or not.

The automatic calibration therefore consists in defining the value of a half unit of time which will have been computed between the descending front and the ascending front of the start bit, then carrying over this value after the front of the start bit to define the middle of the following bit.

Once this is done, the position is located in plane right in the middle of the value of the following bit and it will then suffice to carry over successively the value of one time unit to define the position of each successive bit.

Thanks to this technique, the processor will be able to adapt to different values of the time unit no matter what the configuration used.

In the most common case, the value of the time unit could be 372 CLK or 512 CLK.

Nevertheless, it is always possible that other values will appear in future standards.

A smart card used can be according to the standard ISO 7916-3.

This type of smart card operates in an asynchronous fashion, hence the interest of the process according to the invention.

What is claimed is:

1. Process for measuring a time unit during a dialogue between a reader and a smart card, so as to configure the reader, said time unit corresponding to a length of a bit transmitted in series by the card to the reader, characterized in that said process consists:

in taking into account a descending front of start bit transmitted by the card to the reader, taking into account an ascending front of said start bit, and measuring the time between said descending and ascending fronts, in numbers of cycles of the card clock, to carry out an automatic calibration of the communication processor of the reader with said measured time.

2. Process according to claim 1, characterized in that the measured time corresponds to a low level of the start bit.

3. Process according to claim 1, characterized in that the time is measured in numbers of clock cycles of the card.

4. Process according to claim 1, characterized in that the automatic calibration consists:

in defining the value of a half unit of time, in carrying over this value after the ascending front of the start bit to define the middle of the following bit, successively carrying over a value of a unit of time to define the position of each successive bit.

* * * * *